(12) United States Patent
Zhang et al.

(10) Patent No.: US 12,461,913 B2
(45) Date of Patent: Nov. 4, 2025

(54) BUILDING CROSS TABLE INDEX IN RELATIONAL DATABASE

(71) Applicant: International Business Machines Corporation, Armonk, NY (US)

(72) Inventors: Hong Mei Zhang, Beijing (CN); Shuo Li, Beijing (CN); Xiaobo Wang, Beijing (CN); Sheng Yan Sun, BeiJing (CN)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 17/455,490

(22) Filed: Nov. 18, 2021

(65) Prior Publication Data

US 2023/0153300 A1    May 18, 2023

(51) Int. Cl.
*G06F 16/2453* (2019.01)
*G06F 16/22* (2019.01)

(52) U.S. Cl.
CPC .... *G06F 16/24537* (2019.01); *G06F 16/2282* (2019.01)

(58) Field of Classification Search
CPC ................................................ G06F 16/24537
USPC ................................................. 707/715, 716
See application file for complete search history.

(56) References Cited

U.S. PATENT DOCUMENTS

| | | | |
|---|---|---|---|
| 6,263,331 B1 * | 7/2001 | Liu ..................... | G06F 16/2456 |
| 6,360,213 B1 * | 3/2002 | Wagstaff ............... | G06F 16/284 |
| 6,728,720 B1 * | 4/2004 | Lenzie ................. | G06F 16/22 |
| | | | 707/999.005 |
| 6,965,903 B1 * | 11/2005 | Agarwal ............... | G06F 16/284 |
| | | | 707/999.102 |
| 10,296,498 B2 | 5/2019 | Yang et al. | |
| 11,398,904 B1 * | 7/2022 | Katz ..................... | H04L 9/0869 |
| 11,514,236 B1 * | 11/2022 | Pedapati ............... | G06F 16/221 |
| 2009/0248616 A1 * | 10/2009 | Molini ................ | G06F 16/2456 |
| 2013/0124500 A1 * | 5/2013 | Beavin ............. | G06F 16/24534 |
| | | | 707/E17.017 |
| 2015/0363399 A1 * | 12/2015 | Konik ................. | G06F 16/2237 |
| | | | 707/722 |
| 2015/0363447 A1 * | 12/2015 | Dickie ............. | G06F 16/24578 |
| | | | 707/696 |
| 2017/0169068 A1 * | 6/2017 | Kennedy, Jr. ....... | G06F 16/2433 |
| 2017/0242880 A1 | 8/2017 | Barzilli | |
| 2017/0300519 A1 * | 10/2017 | López ................... | G06F 16/283 |
| 2018/0060318 A1 * | 3/2018 | Yang .................. | G06F 16/2255 |
| 2018/0232457 A1 * | 8/2018 | López ................... | G06F 16/278 |
| 2019/0129952 A1 * | 5/2019 | Yoshida ............ | G06F 16/24578 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Muluemebet Gurmu
(74) *Attorney, Agent, or Firm* — Daniel M. Yeates (57) ABSTRACT

A computer-implemented method to generate and utilize a hybrid index. The method includes receiving a first query, where the first query is configured to perform a first command. The method further includes generating a hybrid index, where the hybrid index defines a connection between a first table and a second table of a set of tables. The method also includes executing the first query using the hybrid index. The method includes returning a set of results for the first query to a source of the query.

20 Claims, 7 Drawing Sheets

(56) References Cited

U.S. PATENT DOCUMENTS

| | | |
|---|---|---|
| 2020/0133732 A1 | 4/2020 | Kondiles et al. |
| 2020/0372004 A1 | 11/2020 | Barber et al. |
| 2021/0334242 A1* | 10/2021 | Potharaju .............. G06F 16/182 |
| 2021/0342785 A1* | 11/2021 | Mann .................... G06T 11/206 |

* cited by examiner

```
CREATE UNIQUE INDEX index-name
ON main_tb (primary_key_column,...)
REFERENCED BY foreign_tb1 (foreign_key_column_B,...)
REFERENCED BY foreign_tb2 (foreign_key_column_C,...)
...
INCLUDE main_tb(column-name_A,...)
child_tb1(column-name_B,...)
child_tb2(column-name_C,...)
```

620

| FLAG | PRIMARY KEY | COLUMN-NAME_A | P-RID | COLUMN-NAME_B | TB2-RID | COLUMN-NAME_C | TB3-RID |
|------|-------------|---------------|-------|---------------|---------|---------------|---------|

BUILDING CROSS TABLE INDEX IN RELATIONAL DATABASE

BACKGROUND

The present disclosure relates to database management, and, more specifically, to building and utilizing a cross table index to reduce computational costs.

Modern database systems can contain relatively large amounts of data. This data can be processed, updated, retrieved, and/or otherwise used for many purposes. Queries can be used to process the data. Queries are generally written to conform to the structure of a database. A single query can retrieve data from multiple data sources, which can result in a variety of potential flow paths to execute the query.

SUMMARY

Disclosed is a computer-implemented method to generate and utilize a hybrid index. The method includes receiving a first query, wherein the first query is configured to perform a first command. The method further includes generating a hybrid index, wherein the hybrid index defines a connection between a first table and a second table of a set of tables. The method also includes executing the first query using the hybrid index. The method includes returning a set of results for the first query to a source of the query. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
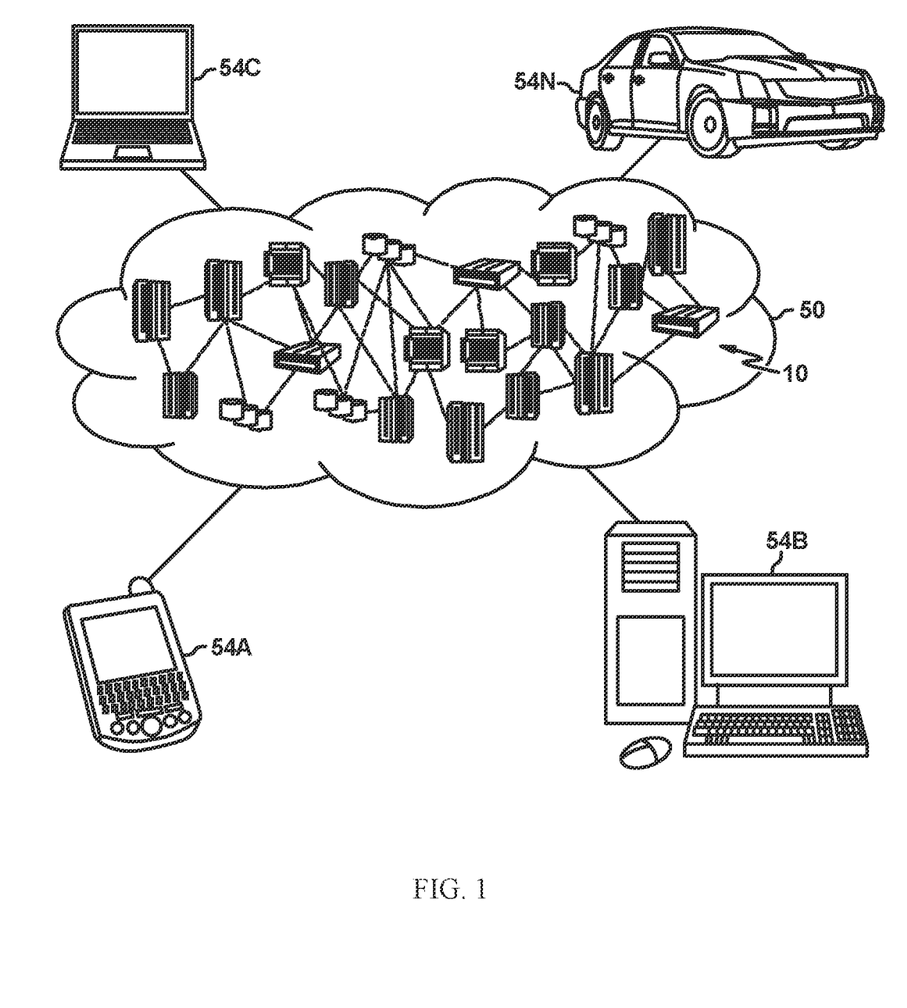
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
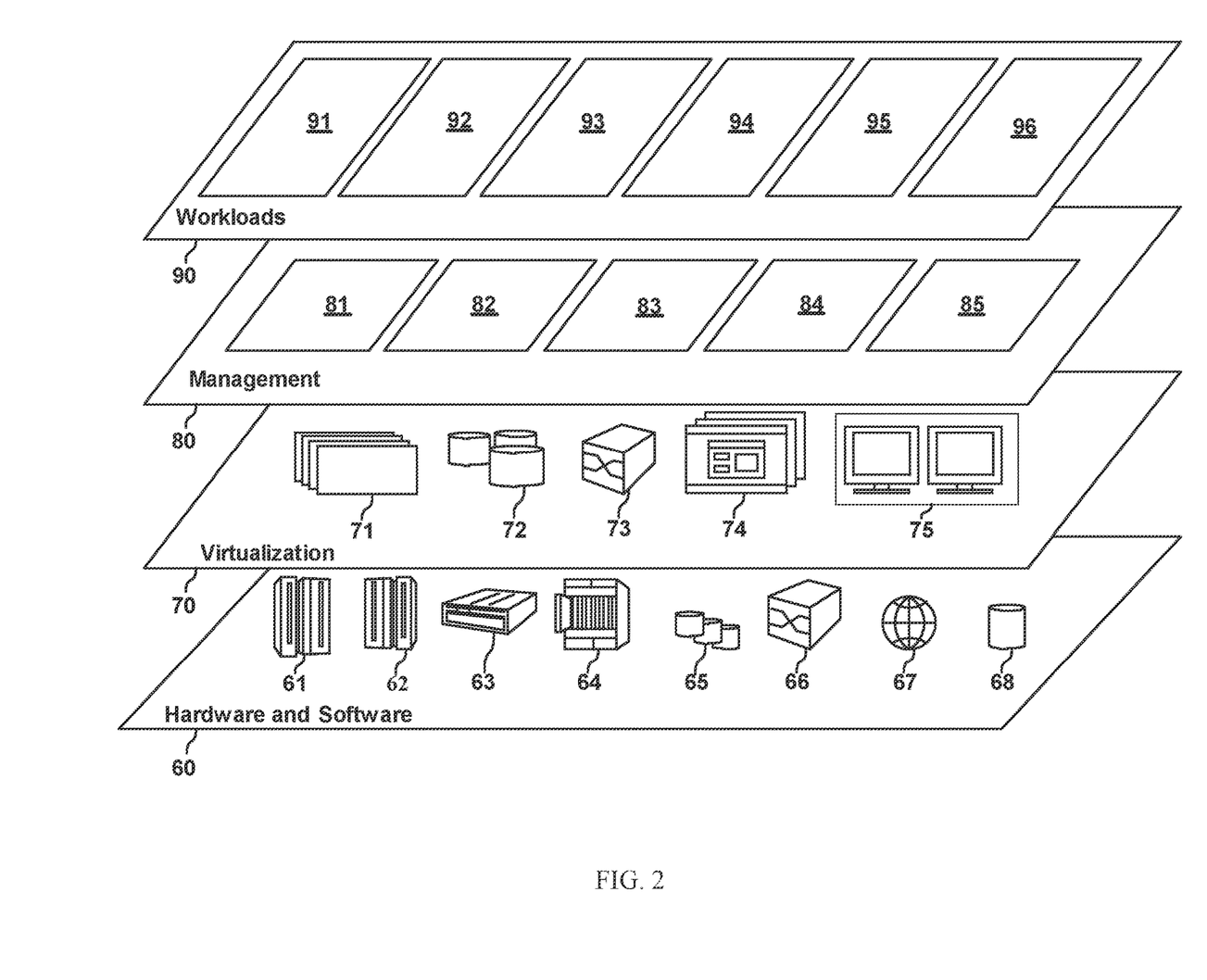
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hybrid indices 96.

Data Processing System in General

Figure 3:
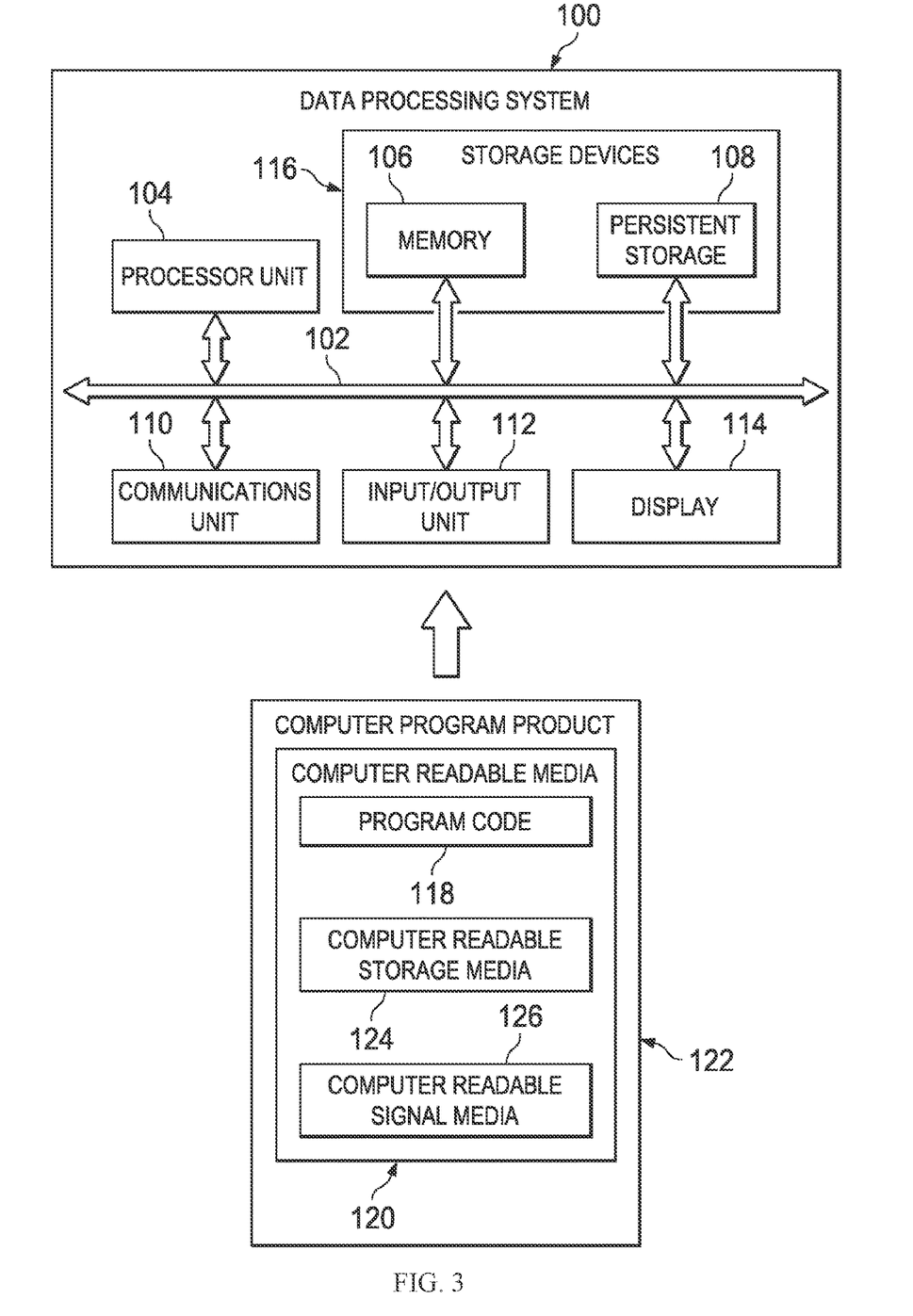
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Modern database systems can contain relatively large amounts of data. This data can be processed, updated, retrieved, and/or otherwise used for many purposes. Queries can be used to process the data. Queries are generally written to conform to the structure of a database. A single query can retrieve data from multiple data sources, which can result in a variety of potential flow paths to execute the query. One or more indices can be used to reduce the time/computational cost to fully execute the queries.

An index is a data structure configured to improve the speed/efficiency of database operations. They can be used to quickly locate data without having to search the entire table. An index can include one or more keys (or primary keys) that indicate the location of the relevant data. The keys can act as a pointer to a location/range where the relevant data is located. Generally, an index is generated for a single table. There is one column/data point that is used to organize/index the data in the relevant table. As such, if two tables are needed, two separate indices can be created/utilized.

Embodiments of the present disclosure include a query manager that can build and utilize a hybrid index, (or composite index, or cross table index). A hybrid table can increase the overall efficiency of a database system. The benefit can be based on effectively reducing/eliminating the cost of join or other similar operations that would require the searching of two or more tables/indices. Said differently, the hybrid index can reduce the number of table accesses and/or the number of indices to open/read to fully execute a query. In some embodiments, the hybrid index can use less memory than have two or more separate indices. This can also increase the overall efficiency of the database system.

A hybrid index can be an index for two or more tables. The hybrid index can be created/generated based on connections between columns from various tables in a database.

Embodiments of the present disclosure include a query manager. The query manager can generate a hybrid index. In some embodiments, the hybrid index is created for two or more tables. In some embodiments, the two or more tables have a column in common and/or a link/relationship between columns from two different tables. The link can be a primary key or a foreign key. A primary key is a column or a set of columns in a table whose values uniquely identify a row in the table. A foreign key is a column or a set of columns in a table whose values correspond to the values of the primary key in a different table. In some embodiments, the link is parent child relationship between the tables. The parent child relationship is the establishment of hierarchal dependencies between two or more columns. In some embodiments the highest/first table in a hierarchy can be the base/basing table. In some embodiments, the hybrid index can be a two-way index. A two-way index can allow for identification of the relevant rows in any of the tables included in the hybrid index.

In some embodiments, the hybrid index can include a root page, one or more non-leaf pages, and one or more leaf pages. There can be any number of non-leaf page layers. The non-leaf page will store the foreign keys for the relevant columns. Each leaf page can store the keys (or foreign keys) with the column values and/or the corresponding row identifiers (ID's) in each basing table. In some embodiments, the hybrid index can allow for any of the tables included in the index to be the base table.

In some embodiments, the query manager can receive a query. The hybrid index can be generated before or after the query is received. The query manager can generate and optimize an access path. In some embodiments, the access path utilized the hybrid index. In some embodiments, the query is a cross table query. A cross table query has predicates/actions that require two or more tables in the database. In some embodiments, the query includes a cross table select. The cross table select can be an index only access using the hybrid index. The index only access cuts out the join functions and thereby reduces the overall cost of executing the query. In some embodiments, the query includes an insert into the parent and/or child tables. To execute, the query manager can open the hybrid index, insert the record into the table, then insert the key into the hybrid index. Only a single index is needed to be open. If each table had an index, both indices would be opened and updated. Thus, the hybrid index reduces the time and computational resources to perform the same operations. In some embodiments, the query includes a delete from the parent and/or child table of the hybrid index. The query manager can open the hybrid index, use the index to identify the location in the table, and then delete the records. Again, only a single index is opened, thereby increasing the efficiency of the database system.

In some embodiments, the hybrid index can be stored, at least when in use, in a cache block. This can allow for faster processing and effective use of the hybrid index. In some embodiments, the hybrid index can be disabled. The disabling can be based on a ratio of read/writes exceeding a threshold. When the threshold is exceeded, the index can be disabled and asynchronously updated during idle time.

The aforementioned advantages are example advantages, and embodiments exist that can contain all, some, or none of the aforementioned advantages while remaining within the spirit and scope of the present disclosure.

Figure 4:
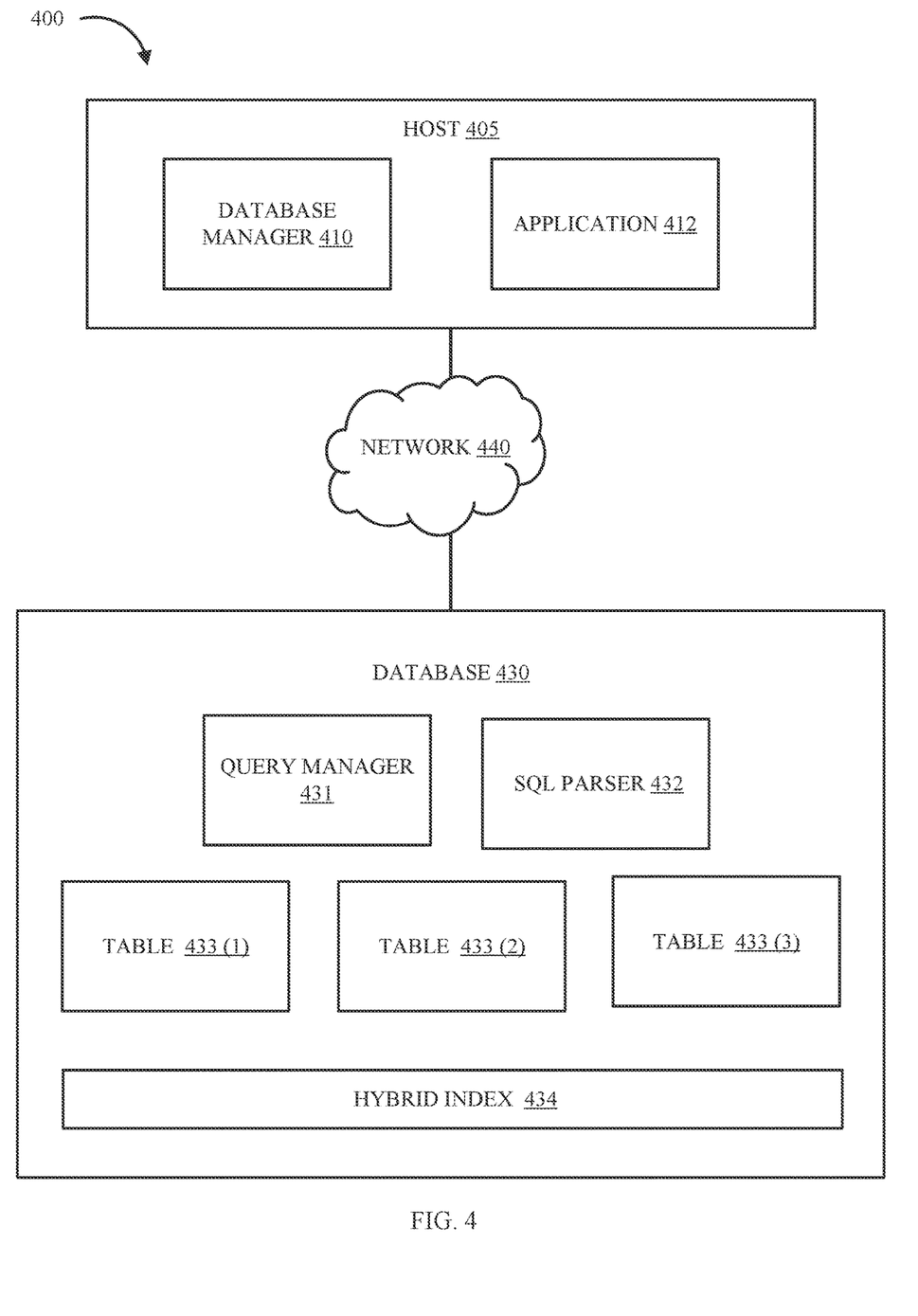
FIG. 4 is a functional diagram of a computing environment suitable for operation of a hybrid index in accordance with some embodiments of the present disclosure.

Referring now to various embodiments of the disclosure in more detail, FIG. 4 is a representation of a computing environment 400 that is capable of running a query manager in accordance with one or more embodiments of the present disclosure. Many modifications to the depicted environment may be made by those skilled in the art without departing from the scope of the disclosure.

Computing environment 400 includes host 405, database 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between and among host 405, database 430, and other computing devices (not shown) within computing environment 400. In some embodiments, each of host 405 and database 430 may include a computer system, such as the data processing system 100 of FIG. 3.

Host 405 can be a standalone computing device, a management server, a web server, a mobile computing device, or any other electronic device or computing system capable of receiving, sending, and processing data. In some embodiments, host 405 can represent a server computing system utilizing multiple computers as a server system, such as in a cloud computing environment 50 (shown in FIG. 1). In some embodiments, host 405 represents a computing system utilizing clustered computers and components (e.g., database server computers, application server computers, etc.) that act as a single pool of seamless resources when accessed within computing environment 400. In some embodiments, host 405 includes database manager 410 and application 412.

Database manager 410 can be any combination of hardware and/or software configured to manage database operations. The operations may include storing, retrieving, querying, manipulating, monitoring, and analyzing data along with other similar operations. In some embodiments, database manager 410 includes a database management system (DBMS). In some embodiments, database manager 410 is part of a federated database system (which can include database 430). A federated database system can transparently map multiple autonomous database systems into a single federated (combined) database. In some embodiments, a federated database system acts as a virtual database, where there is no actual data integration in the constituent databases.

Application 412 can be any combination of hardware and/or software that is configured to generate a query. A query can be a request for data and/or information stored in one or more tables of one or more databases. The databases may be local (e.g., on host 405), or remote (e.g., database 430). In some embodiments, application 412 sends the query to database manager 410, database 430, and/or query manager 431. In some embodiments, the queries generated by application 412 can be sent as a batch to database manager 410 and/or database 430. In some embodiments, the queries can be sent on an as need basis and/or continuously. In some embodiments, application 412 is included in database manager 410 or vice versa. In some embodiments, application 412 can generate/send two or more different queries. In some embodiments, the query is generated in SQL. In some embodiments, application 412 displays the results of the query. The results may be returned in an SQL format, and/or as images, graphs, trends, and/or other similar formats.

In some embodiments, application 412 is part of a computing device separate from host 405. The computing device may communicate with host 405 via network 440. In some embodiments, the computing device can generate queries, send queries to host 405, and/or receive and display the results of the query. In some embodiments, application 412 can include (or be considered) two or more separate applications, wherein each application is configured to generate and send queries to database 430.

In some embodiments, host 405 includes one or more applications consistent with application 412. Or said differently, application 412 can include any number of unique applications. In some embodiments, computing environment 400 includes one or more additional computing devices that include an application consistent with application 412. In some embodiments, each application can generate the same and/or different queries than application 412.

Database 430 can be any combination of hardware and/or software configured to store data in a database system. In some embodiments, database 430 is part of a federated database system. A federated database system can be any number databases that appear as a single database to the requesting device (e.g., host 405, application 412, etc.). In some embodiments, database 430 includes two or more databases communicatively connected that can act as a single database (e.g., a federated database system). In some embodiments, database 430 may be contained within host 405. In some embodiments, database 430 can include query manager 431, SQL parser 432, table 433 (1), table 433 (2), table 433 (n), and hybrid index 434. Table 433(1), table 433(2), and table 433 (n) can represent any number of tables and will be referred to as table 433 collectively, individually, and/or severally.

Query manager 431 can be any combination of hardware and/or software configured to oversee execution of an SQL query. In some embodiments, query manager 431 includes one or more of SQL parser 432, table 433, and hybrid index 434. However, FIG. 4 depicts them as separate components for discussion purposes. In some embodiments, query manager 431 can generate and/or utilize hybrid index 434. In some embodiments, query manager 431 can return results of the query to the source (e.g., host 405). In some embodiments, the queries are multi-table queries. A multi-table query is any query that includes two or more tables in database 430.

The SQL parser 432 can be any combination of hardware and/or software configured to determine actions to be performed from a query. In some embodiments, SQL parser 432 determines individual commands to fully execute the query (e.g., return a set of data). In some embodiments, SQL parser 432 develops an access path for the queries. The access path indicates an order in which to perform the various commands included in a query. In some embodiments, two or more access paths can accomplish the results of the query. SQL parser 432 can optimize the query. The optimizing can include selecting the access path that will result in the lowest cost to fully execute the query. In some embodiments, SQL parser 432 can determine if user of hybrid index 434 is included in the lowest cost access path.

Table 433 can be any data structure configured to store and organize data. In some embodiments, each table can include one or more columns and rows. In some embodiments, any or each table 433 can be linked to at least one other table in database 430. The link can be based on a common data column, a designated relationship (e.g., defined link between tables), a dependency relationship (e.g., a column in table A is used to calculate a column in table B), and the like. In some embodiments, each table includes one or more non-ordering columns. A non-ordering column can hold any type of data. The non-ordering column will be associated with (e.g., on the same row) an ordering column (or a primary key column).

Hybrid index 434 can be a data structure configured to act as an index for two or more tables. In some embodiments, hybrid index 434 is generated for two or more tables. In some embodiments, there can be two or more separate indexes within database 430. Hybrid index 434 can include data for two or more of table 433. In some embodiments, hybrid index 434 can include at least one ordering row and one non-ordering row from each of the two or more tables. The ordering row (or, identifying column, key column, primary key column, etc.) can be the link between the two or more tables. The non-ordering row can be the columns of data associated with the ordering row.

In some embodiments, the contents of hybrid index 434 are based on one or more received queries. For example, if one query request Table A column 1 and Table B column 3, then the hybrid index can include the referenced columns. In some embodiments, the hybrid index 434 is based on columns/tables that are frequently referenced in various queries. For example, if 75% of queries use a column called "customer ID" and 60% use a column called "Email", in a different table, then hybrid index 434 can be generated for those two columns/tables. In some embodiments, the contents of hybrid index 434 includes all common columns between tables. For example, if three separate tables can have a "Customer ID" column, then those three tables can be used to build hybrid index 434. In some embodiments, hybrid index 434 includes a row ID ("RID") column for each table in the index. Any number of additional columns from each table can be included in hybrid index 434.

Figure 5:
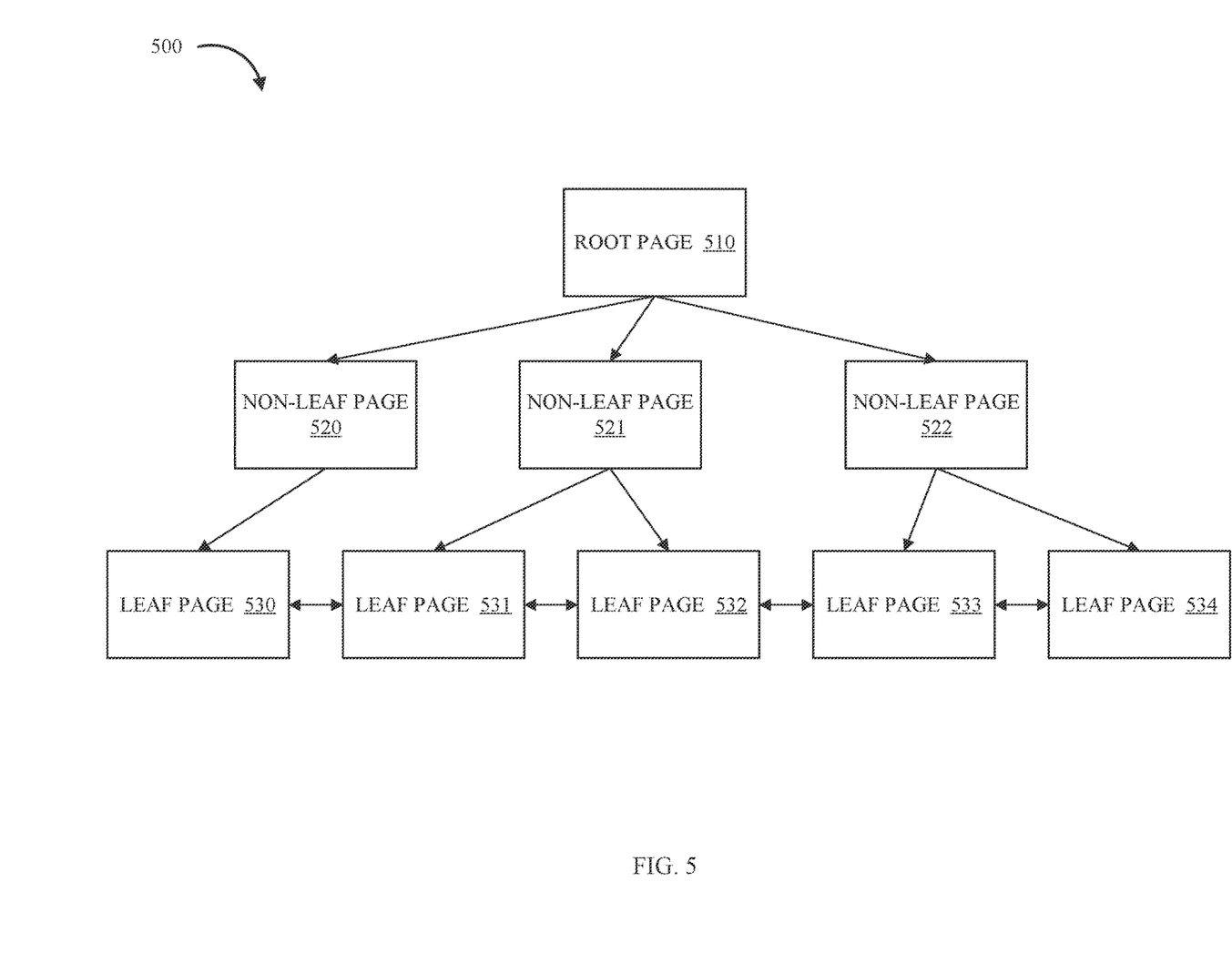
FIG. 5 includes a structure for a hybrid index in accordance with some embodiments of the present disclosure.

FIG. 5 includes an embodiment of a hybrid index structure. FIG. 5 includes root page 510, non-leaf page 520, non-leaf page 521, non-leaf page 522, leaf page 530, leaf page 531, leaf page 532, leaf page 533, and leaf page 534. Various embodiments can have different number of layers, non-leaf pages, and leaf pages.

Root page 510 can include a page pointer and a primary key. Root page 510 can include one or more primary keys that refer to one or more non-leaf pages. The key in root page 510 can point to a primary table and/or a child table. Each non-leaf page can include a different primary key. The number of keys, and the number of sub-layers that are referenced can be based on the amount of data that is held in the index. Each leaf page can include more than one key. The leaf page can include an index key, and a key for each included column (e.g., a column key). In some embodiments, a foreign key is one that points to the specific column of data.

Figure 6:
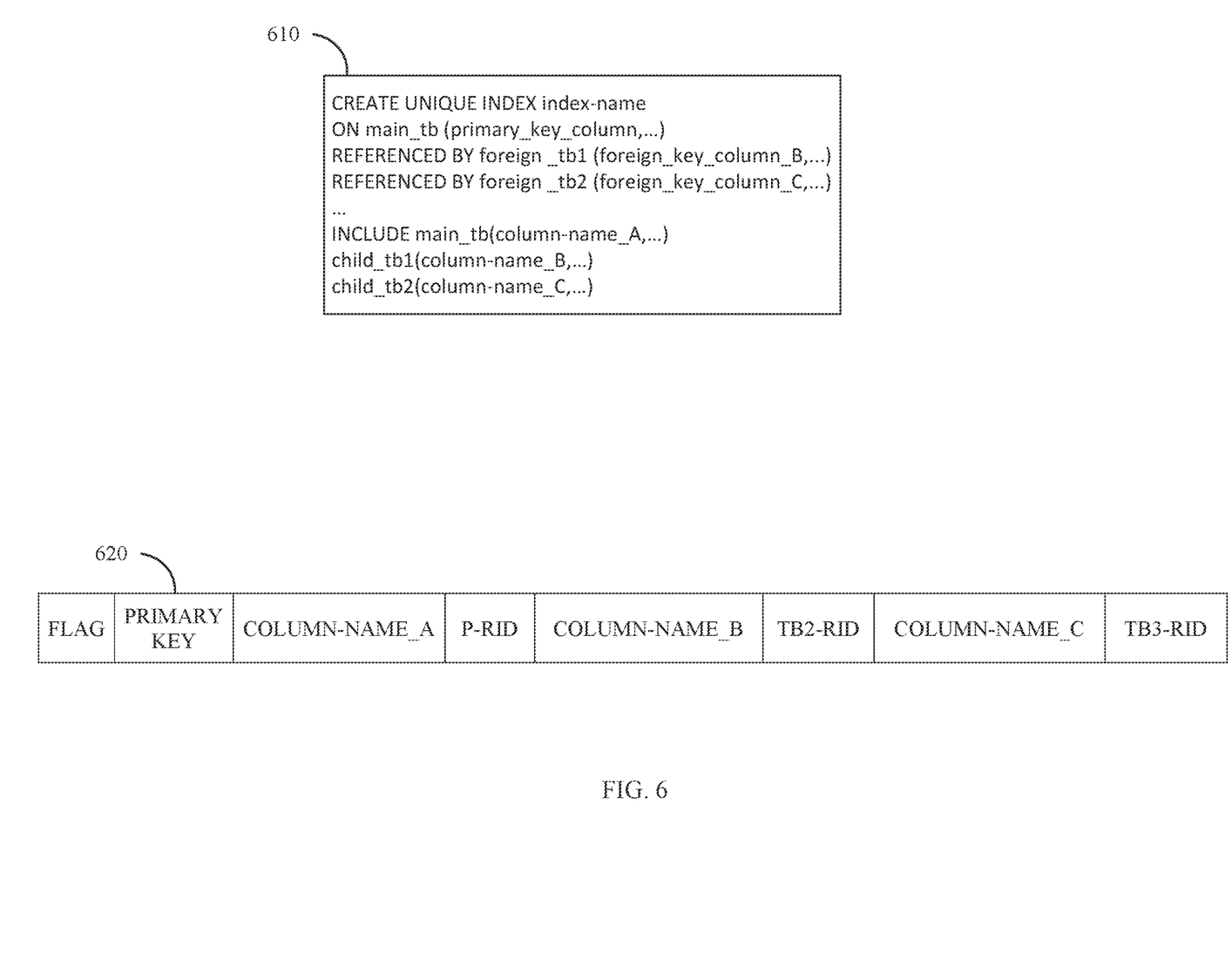
FIG. 6 includes an example instruction to generate and an example layout of a hybrid index in accordance with some embodiments of the present disclosure.

FIG. 6 includes an example instruction to create a hybrid table and column structure of a hybrid index. FIG. 6 includes command 610, and index 620. Command 610 includes the instruction to create an index of "index-name" with three tables. There is the parent table "main_tb" and two child tables "foreign_tb1" and "foreign_tb2". For each table, the instruction includes a key column that links the three tables. This could be a customer ID, as an example. The instruction also includes which columns to include from each table, identified as "column-name_A", "column-name_B", and "column-name_C". There can be additional columns added from each table as needed. Index 620 has eight columns. In some embodiments, index 620 includes a flag column. The flag column can be a header for the hybrid index. One or more leaf pages can point to the flag column. The primary key column is the link between the primary table and the two child tables. The primary key can also be an identified column. There is a column for each included column from each table. This embodiment has three columns, one from each table, "column-name_A", "column-name_B", and "column-name_C". The remaining columns are RID columns. There will always be one RID column for each table. There will always be one RID column for each table included in hybrid index 434. There can be more than one column included. One hybrid index will use less storage/memory than three separate indices for each table.

Figure 7:
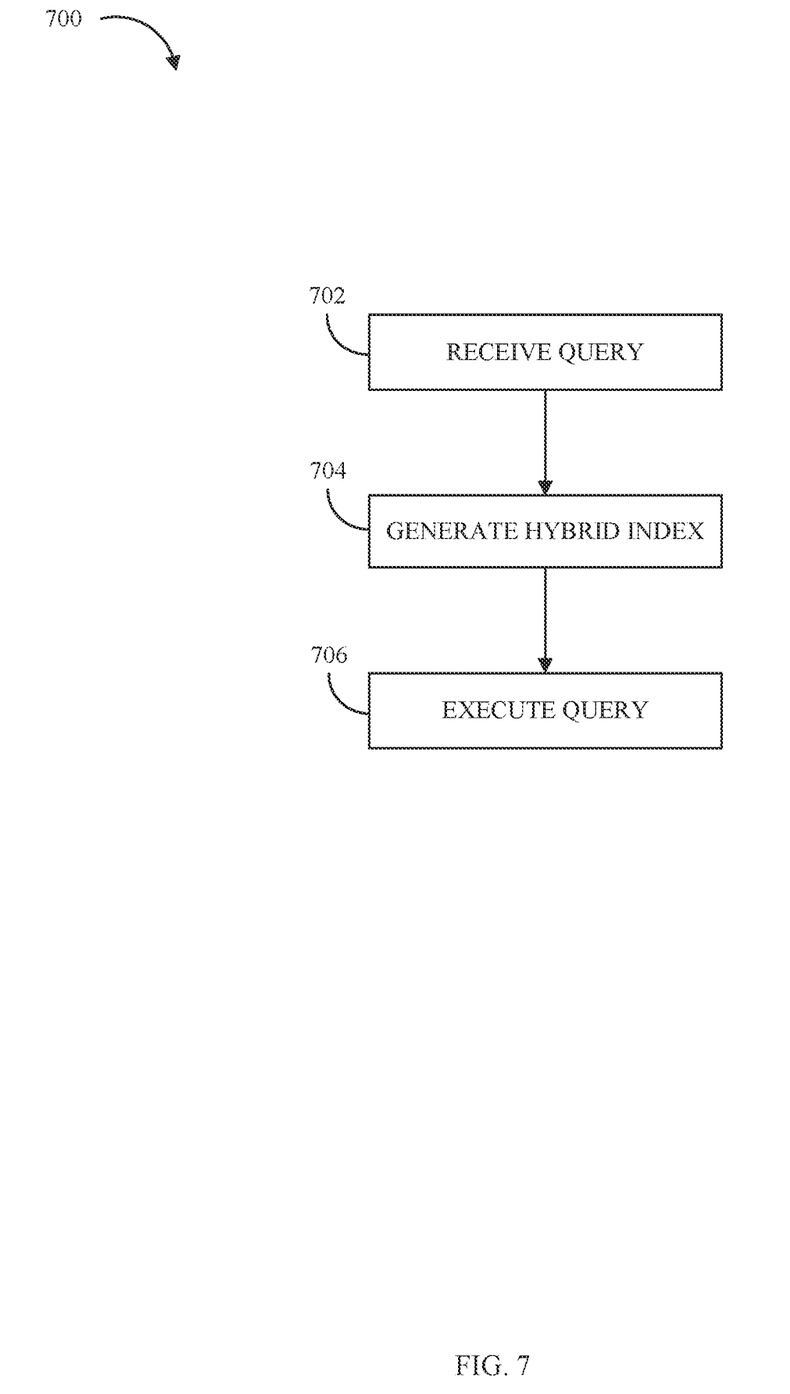
FIG. 7 is a flow chart of an example method to generate and use a hybrid index, in accordance with some embodiments of the present disclosure.

FIG. 7 depicts a flowchart of an example method 700, for generating and utilizing a hybrid index that can be performed in a computing environment (e.g., computing environment 400 and/or cloud computing environment 50). One or more of the advantages and improvements described above for generating and utilizing hybrid index may be realized by method 700, consistent with various embodiments of the present disclosure.

Method 700 can be implemented by one or more processors, host 415, database manager 410, application 412, database 430, query manager 431, SQL parser 432, table 433, hybrid index 434 and/or a different combination of hardware and/or software. In various embodiments, the various operations of method 700 are performed by one or more of host 415, database manager 410, application 412, database 430, query manager 431, SQL parser 432, table 433, and hybrid index 434. For illustrative purposes, the method 700 will be described as being performed by query manager 431.

At operation 702, query manager 431 receives a query. In some embodiments, the query is received from application 412, database manager 410, and/or host 405. In some embodiments, the query is received in Standard Query Language (SQL). In some embodiments, the query is configured to perform one or more commands on a set of data stored in database 430. In some embodiments, the received query is configured to perform operations in two or more of tables 433. The query can include one or more of a select command, a delete command, an insert command, and an update command. In some embodiments, operation 702 includes generating a query access path. The query access path can represent the order of operations to properly execute the query. The query access path can be optimized by an optimizer. The optimizer can generate multiple paths to process the query and predict which of the multiple paths has the lowest cost.

At operation 704, query manager 431 generates a hybrid index. (e.g., hybrid index 434). In various embodiments, the order of operation 704 and 702 can be switched. In some embodiments, hybrid index 434 can be used for multiple queries. In some embodiments, the query can include an instruction to generate hybrid index 434 (e.g., see FIG. 6). In some embodiments, the structure and format of the hybrid index are consistent with FIGS. 5 and 6.

In some embodiments, the hybrid index in maintained in a cache block. The cache block can be a portion of relatively high speed memory compared to long term storage. This can allow for high concurrency of transactions and make the index more useful to the database system.

At operation 706, query manager 431 executes the query. In some embodiments, the hybrid index is used to execute the query. This can greatly reduce the cost needed to execute the query. In particular, the hybrid index can eliminate the need to perform a join command. Join commands are generally computationally expensive. The query can be executed based on the query access path. As new queries are generated and/or as software is updated the hybrid index can be updated (or a new hybrid index generated) to better process new/updated queries. In some embodiments, operation 706 includes returning the query to the source. Returning can include sending a data set and/or a confirmation that the actions of the query were completed.

In some embodiments, the query includes an insert command. To execute the insert command, query manager 431 can open the hybrid index, find the parent key in the index, insert the record into the database, and then insert the key for the new record into the index. In this way, the method only requires opening one index instead of two like traditional indexing methods.

In some embodiments, the query includes a delete command. To execute the delete command, query manager 431 opens the hybrid index, uses the index key to identify the location of the records and then deletes the records in all tables as instructed by the query. A similar benefit for delete commands exists as for insert commands. Only one index is opened, and it can reduce I/O while searching for the appropriate rows/keys to process the query.

In some embodiments, the query includes a select command. To execute the select command, query manager 431 can open the index, use the query to find the relevant keys from the index, pull the data from the index, then output the result. There is no need to access either table and/or perform any join operation. This can result in a significant computing cost saving.

In some embodiments, the hybrid index can be disabled during query execution. In some embodiments, the disabling is based on the read/write ratio (or vice versa). Said differently, the disabling can be based on the number of insert/update/select commands compared against each other. As the ratio of writes increases compared to reads, it is more likely the index will become outdated. The index can be disabled. In some embodiments, the hybrid index is asynchronously updated during idle time, and re-enabled once the updates are complete and/or the ratio returns below the threshold.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a first query, wherein the first query is a standard query language (SQL) query, the first query is configured to perform a first command that accesses a first column of a first table and a second column of a second table in a first database, the first database includes a set of tables, and the first database is a relational database;
generating, based on the received first query, a hybrid index, wherein the hybrid index defines a connection between the first table and the second table of the set of tables and the connection is based on a common column in the first table and the second table, and the hybrid index is a unique data structure;
executing the first query using the hybrid index, wherein the first command is executed on the hybrid index; and
returning a set of results for the first query to a source of the query.

2. The method of claim 1, wherein the hybrid index includes the common column that contains a record identifier from each of the first table and the second table, and at least one non-ordering column from the first table and the second table.

3. The method of claim 2, wherein the hybrid index includes a plurality of leaf pages and a plurality of non-leaf pages, each non-leaf page includes a primary key for the common column, and each leaf page includes a foreign key for a non-ordered column, and a row identifier.

4. The method of claim 3, wherein the first table and the second table is a base table for executing the query.

5. The method of claim 1, wherein the receiving the first query is in response to generating the hybrid index, the method further comprising:
receiving, in response to the executing the first query, a second query, wherein the second query is configured to perform a second command;
executing the second query using the hybrid index; and
returning a second set of results for the second query to the source.

6. The method of claim 1, wherein the first command includes an insert command to insert a first record into the second table, and the executing the first command includes finding the record in the hybrid index, inserting the record into the second table, and updating the hybrid index by inserting a new key for the record into one hybrid index.

7. The method of claim 1, wherein the first command includes a delete command to delete a record from the first table and the second table, and the executing the first command includes locating the record in the hybrid index, and, in response to the locating the command in the hybrid index, deleting the record from the first table and the second table.

8. The method of claim 1, wherein the query includes a select command from the first table and the second table, and the executing the query includes an index only access from the hybrid index.

9. The method of claim 8, wherein the index only access prevents executing a join operation between the first table and the second table.

10. The method of claim 5, further comprising:
disabling, in response to a ratio of writes to reads exceeding a threshold, the hybrid index.

11. The method of claim 10, further comprising:
updating, in response to the disabling, the hybrid index; and
enabling, in response to the updating, the hybrid index.

12. The method of claim 2, wherein the first column is the at least one non-ordering column from the first table and the second column is the at least one non-ordering column from the second table.

13. A system comprising:
a processor; and
a computer-readable storage medium communicatively coupled to the processor and storing program instructions which, when executed by the processor, are configured to cause the processor to:
receive a first query, wherein the first query is a standard query language (SQL) query, the first query is configured to perform a first command that accesses a first column of a first table and a second column of a second table in a first database, the first database includes a set of tables, and the first database is a relational database;
generate, based on the received first query, a hybrid index, wherein the hybrid index defines a connection between the first table and the second table of the set of tables and the connection is based on a common column in the first table and the second table, and the hybrid index is a unique data structure;
execute the first query using the hybrid index, wherein the first command is executed on the hybrid index; and
return a set of results for the first query to a source of the query.

14. The system of claim 13, wherein the hybrid index includes the common column that contains a record identifier from each of the first table and the second table, and at least one non-ordering column from the first table and the second table.

15. The system of claim 14, wherein the hybrid index includes a plurality of leaf pages and a plurality of non-leaf pages, each non-leaf page includes a primary key for the common column, and each leaf page includes a foreign key for a non-ordered column, and a row identifier.

16. The system of claim 15, wherein the first table and the second table can be a base table for executing the query.

17. A computer program product, the computer program product comprising a computer readable storage medium having program instructions embodied therewith, the program instructions executable by a processing unit to cause the processing unit to:
receive a first query, wherein the first query is a standard query language (SQL) query, the first query is configured to perform a first command that accesses a first column of a first table and a second column of a second table in a first database, the first database includes a set of tables, and the first database is a relational database;
generate, based on the received first query, a hybrid index, wherein the hybrid index defines a connection between the first table and the second table of the set of tables and the connection is based on a common column in the first table and the second table, and the hybrid index is a unique data structure;
executing the first query using the hybrid index, wherein the first command is executed on the hybrid index; and
returning a set of results for the first query to a source of the query.

18. The computer program product of claim 17, wherein the hybrid index includes the common column that contains a record identifier from each of the first table and the second table, and at least one non-ordering column from the first table and the second table.

19. The computer program product of claim 18, wherein the hybrid index includes a plurality of leaf pages and a plurality of non-leaf pages, each non-leaf page includes a primary key for the common column, and each leaf page includes a foreign key for a non-ordered column, and a row identifier.

20. The computer program product of claim 19, wherein the first table and the second table can be a base table for executing the query.

* * * * *